UNITED STATES PATENT OFFICE.

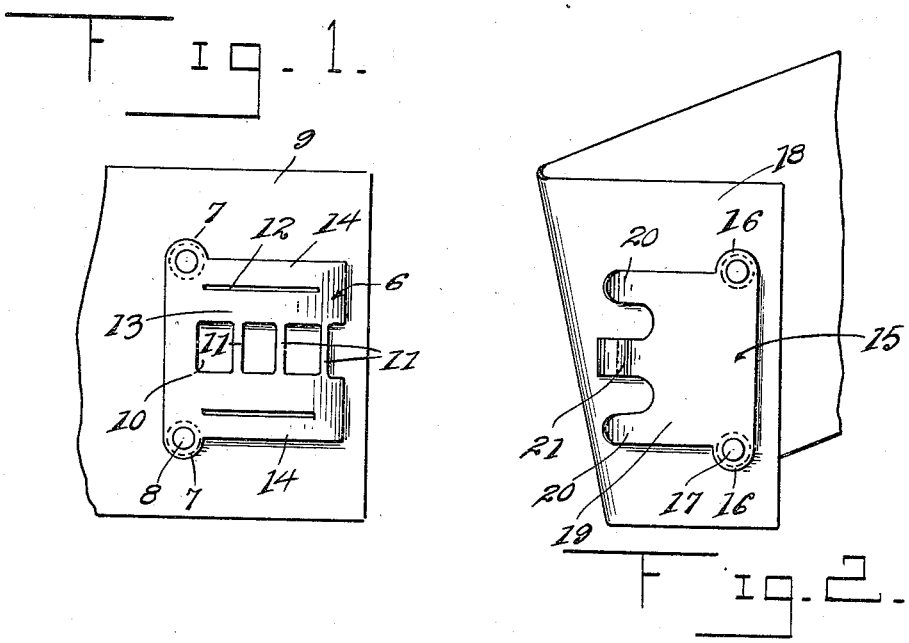
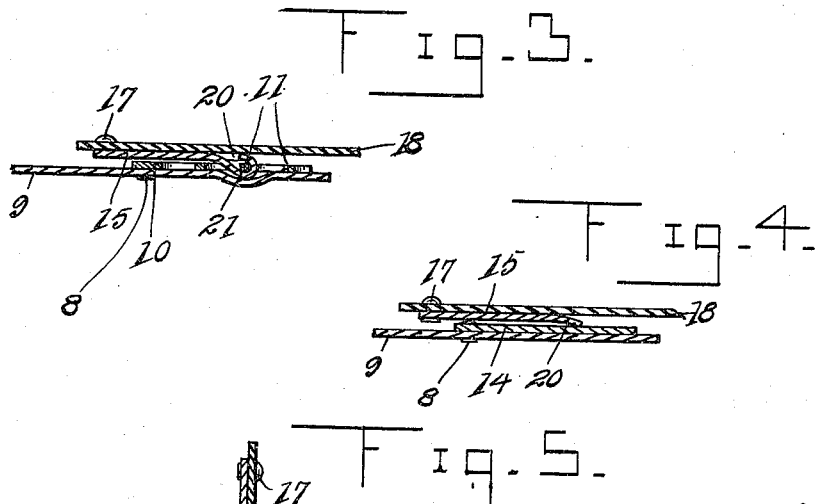

DANIEL BAILEY, OF TECUMSEH, MICHIGAN, ASSIGNOR OF ONE-HALF TO E. D. CHILSON, OF TECUMSEH, MICHIGAN.

FASTENER.

1,150,482.   Specification of Letters Patent.   Patented Aug. 17, 1915.

Application filed November 19, 1913. Serial No. 801,935.

*To all whom it may concern:*

Be it known that I, DANIEL BAILEY, a citizen of the United States, residing at Tecumseh, in the county of Lenawee and State of Michigan, have invented certain new and useful Improvements in Fasteners; and I do hereby declare the following to be a full, clear, and exact description of the invention, such as will enable others skilled in the art to which it appertains to make and use the same.

This invention embraces improvements in fasteners and relates more particularly to those of the separable type which are especially adapted for securing shoes and gloves, and which may also be used for other purposes.

One of the objects of the invention is to provide a separable fastener of extremely simple construction, practical, and which, when in operative position, will be concealed from sight.

Another object of the invention is to provide a fastener of this nature comprising two separable members, one of which may be termed a passive member and the other an active member, each of said members being formed from a spring metal plate.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a plan view of the passive member forming a part of my improved fastener, Fig. 2 is a plan view of the active member, Fig. 3 is a central longitudinal sectional view, showing the members connected to each other and in their operative position, Fig. 4 is a longitudinal sectional view adjacent the edge of the fastener, showing the same in its operative position, and Fig. 5 is a sectional view, showing the active member disposed at right angles to the passive member.

Referring in detail to the drawings by numerals, 6 designates generally the passive member which consists of a rectangular spring metal plate having projections 7 formed upon the longitudinal edges adjacent the outer ends thereof. These projections are apertured to receive rivets 8, whereby the member may be secured to one edge 9 of a glove or shoe or any other suitable article. The plate 6 is formed with a central series of openings 10 which provide a plurality of parallel transverse connecting bars 11. The plate is also provided with a pair of longitudinal slots 12 which divide said plate into a central section 13 and two outer sections 14. It will be understood that any number of openings 10 may be provided, and that the slots 12 may be of different lengths with respect to the length of the plate.

The active member generally designated 15 is formed from a plate of spring metal, said plate being formed with ears or projections 16 through which attaching studs or rivets 17 extend, said rivets being for the purpose of securing the member to the portion 18 of the article to be fastened or connected to the edge 9. The member 15 includes a body or base portion 19, the spring arms 20, and hooked tongue 21. The spring arms have their free extremities rounded, as clearly shown in Fig. 2, and are curved slightly adjacent said extremities from the plane of the body portion, as shown in Fig. 5. The tongue 21 is disposed between the spring arms 20, and has its free extremity bent to form a hook 22. It will be noted that the hook faces in a direction opposite to that in which the extremities of the arms 20 are extended, that the arms are adjacent the edges of the base 19, and that the tongue is disposed in alinement with the center of the base portion.

When it is desired to connect the two members, the tongue is engaged with one of the cross bars 11, and the base 19 is then swung flatly against the passive member. When the tongue is engaged with one of the cross bars 11, the spring arms 20 engage the outer portions 14 of the passive member and these arms are of such a length as to cause these outer portions to be forced away from the active member when the latter is swung into the plane at right angles to the passive member, as shown in Fig. 5. As soon as the active member is swung from a plane at right angles to the passive member so as to bring the inner faces of the two members closer to one another, the outer portions 14 of the passive member will bear against the inner edges of the spring arms adjacent their extremities and cause the active member to snap into engagement with the passive member, as shown in Figs. 3 and 4. The sections 9 and 18, which are connected by the fastener, exert a pull in opposite directions upon the members of the fastener, but as the lines of force are practically parallel with the members, they will not separate them, since a rotational movement of the members, relative to one another, is necessary before said members can be disconnected.

From the foregoing description taken in connection with the accompanying drawings, it will be seen that I have provided a fastener which, when in operative position, is concealed from sight, which is extremely simple in construction, and which is so formed as to render accidental separation of its two members practically impossible.

While I have shown and described the preferred embodiment of my invention, it will be understood that minor changes in construction, combination and arrangement of parts may be made without departing from the spirit and scope of the invention as claimed.

Having thus described my invention, I claim:—

1. A separable fastener comprising a passive member and an active member, the passive member having a pair of spaced longitudinal slots to divide the same into a central section and two outer spring sections, said central section being recessed to form a plurality of connecting bars, the active member comprising a base portion, a pair of spring arms formed thereon for engagement with the outer spring sections of the passive member, and a tongue disposed between said arms, said tongue being adapted to hook into engagement with any one of said connecting bars.

2. A separable fastener comprising a passive member including a central section and outer spring sections, the central section having a recess with transverse connecting bars extending across the same, means for securing the passive member upon the outer face of a divided member along one edge thereof, an active member, means for securing the active member upon the inner face of said divided member along the remaining edge thereof, said active member including a tongue projecting from its inner free edge for engagement around one of the connecting bars, and a pair of spring arms formed in opposite sides of said tongue and carried by the active member for binding engagement against the outer spring sections of the passive member when the tongue is engaged around one of the connecting bars to cause the active member to move into operative position against the outer face of the passive member.

In testimony whereof I affix my signature in presence of two witnesses.

DANIEL BAILEY.

Witnesses:
 FRED B. WOOD,
 ALMA M. KLAFFENSTEIN.

Copies of this patent may be obtained for five cents each, by addressing the "Commissioner of Patents, Washington, D. C."